United States Patent
Okano et al.

(10) Patent No.: US 11,902,421 B2
(45) Date of Patent: Feb. 13, 2024

(54) SERVER DEVICE, COMMUNICATION TERMINAL, COMMUNICATION SYSTEM, AND PROGRAM

(71) Applicant: NIPPON TELEGRAPH AND TELEPHONE CORPORATION, Tokyo (JP)

(72) Inventors: Yuki Okano, Tokyo (JP); Reo Yoshida, Tokyo (JP); Tetsutaro Kobayashi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 347 days.

(21) Appl. No.: 17/287,101

(22) PCT Filed: Oct. 15, 2019

(86) PCT No.: PCT/JP2019/040512
§ 371 (c)(1),
(2) Date: Apr. 20, 2021

(87) PCT Pub. No.: WO2020/085151
PCT Pub. Date: Apr. 30, 2020

(65) Prior Publication Data
US 2021/0391981 A1     Dec. 16, 2021

(30) Foreign Application Priority Data
Oct. 24, 2018     (JP) .................................. 2018-200333

(51) Int. Cl.
*H04L 9/06*     (2006.01)
*H04L 9/08*     (2006.01)
*H04L 9/40*     (2022.01)

(52) U.S. Cl.
CPC .......... *H04L 9/0662* (2013.01); *H04L 9/0833* (2013.01); *H04L 9/0869* (2013.01);
(Continued)

(58) Field of Classification Search
CPC ... H04L 9/0662; H04L 9/0833; H04L 9/0869; H04L 9/0891; H04L 9/0894; H04L 63/0471; H04L 63/065
See application file for complete search history.

(56) References Cited

U.S. PATENT DOCUMENTS

| 9,584,493 | B1 * | 2/2017 | Leavy ................... H04L 63/104 |
| 9,673,973 | B1 * | 6/2017 | Leavy ................... H04L 9/0643 |
| 2019/0238523 | A1 | 8/2019 | Okano et al. |

FOREIGN PATENT DOCUMENTS

| CA | 2998994 C | * | 7/2018 | ......... H04L 63/0435 |
| JP | 2009-104445 A |  | 5/2009 | |
| WO | 2018/016330 A1 |  | 1/2018 | |

OTHER PUBLICATIONS

NTT Software, "A group chat for business: TopicRoom", [online], NTT Software, [searched on Sep. 28, 2017], Internet<URL:https://www.ntt-yx.co.jp/products/topicroom/index.html>.
(Continued)

*Primary Examiner* — Mohammed Waliullah

(57) ABSTRACT

A server device includes a memory and a processor to execute saving an encrypted text of a message generated by encrypting the message with a message key generated from a shared key and a group identifier, by using a message key identifier as an identifier of the message key as a key; saving an encrypted text of the message key generated by encrypting the message key to be re-encryptable by using the shared key, by using the message key identifier as a key; and receiving, after update of the shared key, a re-encryption key from a communication terminal that has generated the re-encryption key by using the shared key and the updated
(Continued)

shared key, using the re-encryption key to generate a re-encrypted encrypted text of the message key, and overwriting the encrypted text of the message key before re-encryption with the re-encrypted encrypted text of the message key.

7 Claims, 16 Drawing Sheets

(52) U.S. Cl.
CPC .......... *H04L 9/0891* (2013.01); *H04L 9/0894* (2013.01); *H04L 63/0471* (2013.01)

(56) References Cited

OTHER PUBLICATIONS

Kobayashi et al. (2016) "Scalable Dynamic Multi-Person Key Distribution Protocol"; SCIS 2016—Symposium on Cryptography and Information Security—Paper Collection, General Incorporated Association of Inst. of Electronics, Jan. 2016, 4E2-3.

Boneh et al. (2014) "Key Homomorphic PRFs and Their Applications", CryptologyePrint Archive, Report 2015/220, (2015), http://eprint.iacr.org/2015/220.

Moriyama et al. (2011) "Mathematics of public key cryptography", Kyoritsu Publishing.

Yoneyama et al. (2018) "Exposure-Resilient Identity-Based Dynamic Multi-Cast Key Distribution", IEICE Transactions on Fundamentals of Electronics, Communications and Computer Sciences, 101(6), 929-944.

\* cited by examiner

FIG.5

| ENCRYPTED TEXT OF MESSAGE | ENCRYPTED TEXT OF MESSAGE KEY |
|---|---|
| $C_{1,message}$ | $C_{1,key}$ |
| $C_{2,message}$ | $C_{2,key}$ |
| $C_{3,message}$ | $C_{3,key}$ |
| $C_{4,message}$ | $C_{4,key}$ |
| $C_{5,message}$ | $C_{5,key}$ |
| ... | ... |

TEXTS TO BE RE-ENCRYPTED

FIG.6

| ENCRYPTED TEXT OF MESSAGE | CORRESPONDING KEY ID |
|---|---|
| $C_{1,message}$ | $ID_1$ |
| $C_{2,message}$ | $ID_1$ |
| $C_{3,message}$ | $ID_2$ |
| $C_{4,message}$ | $ID_2$ |
| $C_{5,message}$ | $ID_2$ |
| ... | ... |

| KEY ID | ENCRYPTED TEXT OF MESSAGE KEY |
|---|---|
| $ID_1$ | $C_{1,key}$ |
| $ID_2$ | $C_{2,key}$ |
| ... | ... |

TEXTS TO BE RE-ENCRYPTED

FIG.9

| ENCRYPTED TEXT OF MESSAGE | MESSAGE KEY ID | ... |
|---|---|---|
| $C_{2,m_1}$ | $KeyID_1$ | ... |
| $C_{2,m_2}$ | $KeyID_1$ | ... |
| $C_{2,m_3}$ | $KeyID_2$ | ... |
| $C_{2,m_4}$ | $KeyID_3$ | ... |
| $C_{2,m_5}$ | $KeyID_3$ | ... |
| $C_{2,m_6}$ | $KeyID_3$ | ... |

FIG.10

| MESSAGE KEY ID | ENCRYPTED TEXT OF MESSAGE KEY | ... |
|---|---|---|
| $KeyID_1$ | $C_{1,K_1}^{(a)}$ | ... |
| $KeyID_2$ | $C_{1,K_2}^{(a)}$ | ... |
| $KeyID_3$ | $C_{1,K_3}^{(a)}$ | ... |

⬇ RE-ENCRYPTION (SHARED KEY $SK_a \to SK_b$)

| MESSAGE KEY ID | ENCRYPTED TEXT OF MESSAGE KEY | ... |
|---|---|---|
| $KeyID_1$ | $C_{1,K_1}^{(b)}$ | ... |
| $KeyID_2$ | $C_{1,K_2}^{(b)}$ | ... |
| $KeyID_3$ | $C_{1,K_3}^{(b)}$ | ... |

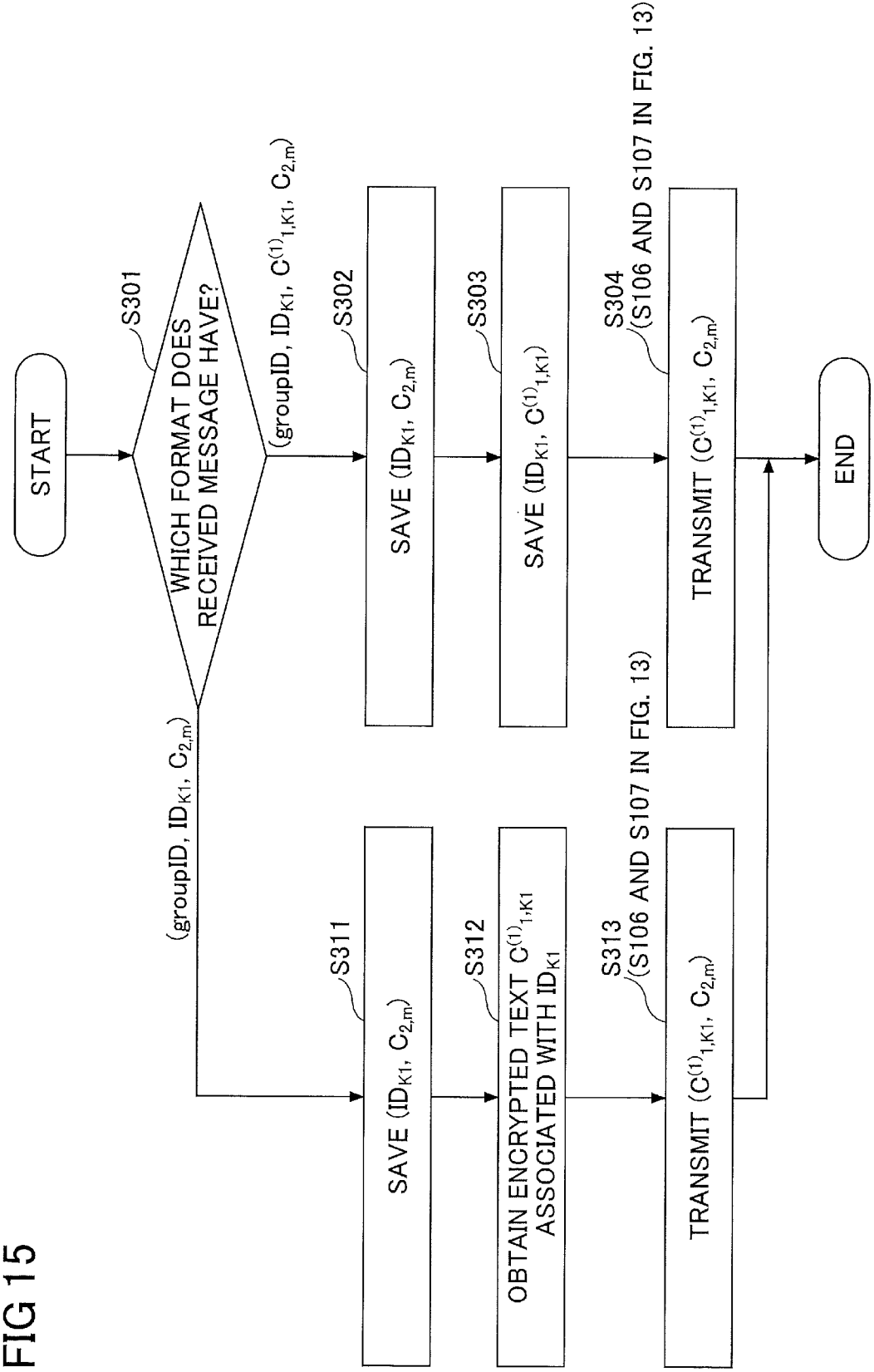

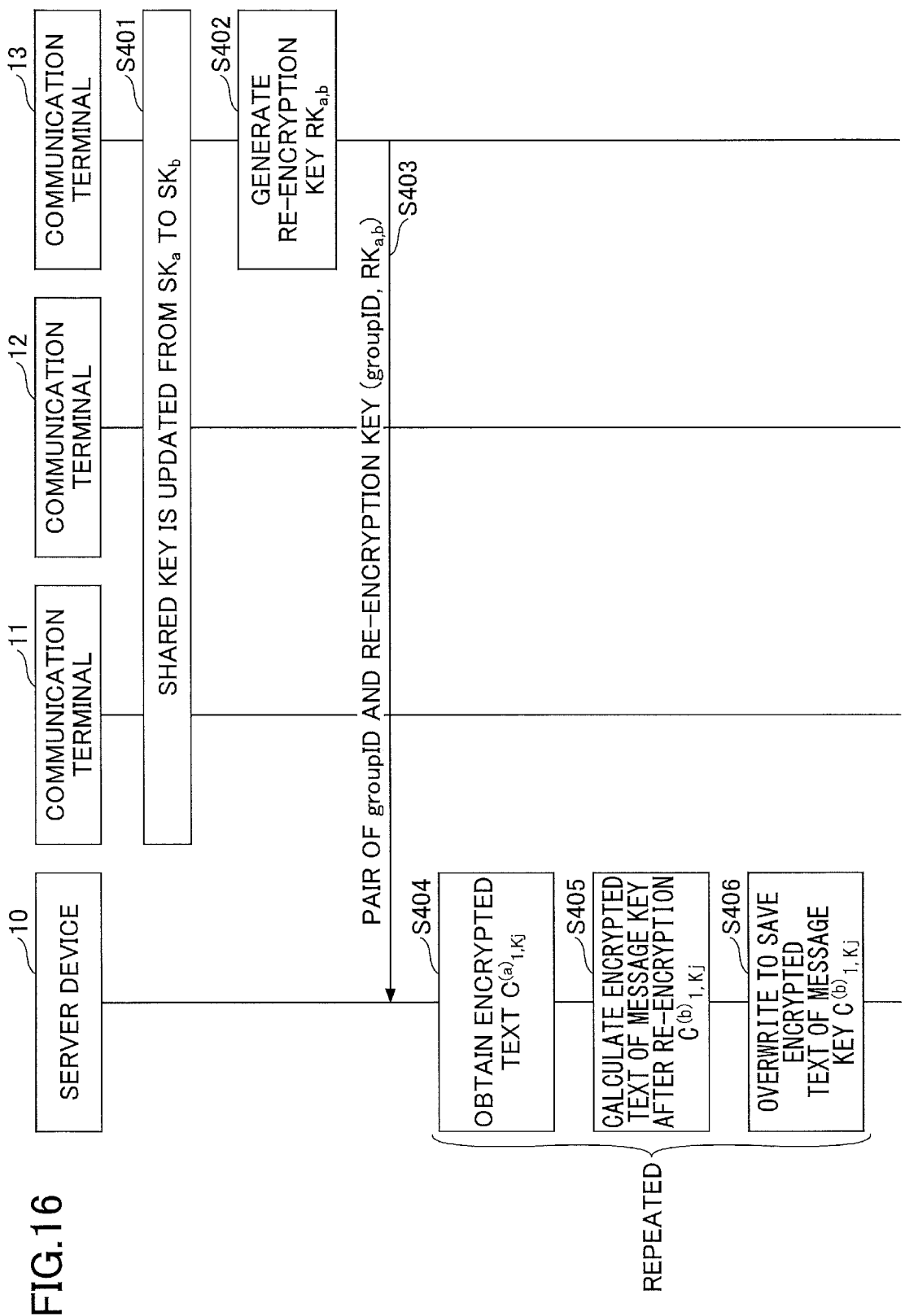

SERVER DEVICE, COMMUNICATION TERMINAL, COMMUNICATION SYSTEM, AND PROGRAM

CROSS-REFERENCE TO RELATED APPLICATIONS

This application is a U.S. 371 Application of International Patent Application No. PCT/JP2019/040512, filed on 15 Oct. 2019, which application claims priority to and the benefit of JP Application No. 2018-200333, filed on 24 Oct. 2018, the disclosures of which are hereby incorporated herein by reference in their entireties.

TECHNICAL FIELD

The present invention relates to a technique for exchanging messages between communication terminals while concealing the messages from a server device.

BACKGROUND ART

With the spread of smartphones and tablets, as messaging systems that would replace e-mails, in recent years, systems that are capable of exchanging messages by simple operations have become available for general use.

Thereupon, thanks to advantages in convenience and promptness of information sharing, group chat systems (e.g. Non-Patent Document 1) supposed to be used in business have also emerged. Taking into account risk of leakage of confidential information of corporations, such a group chat system is built as a cloud-based system that leaves no data on communication terminals.

Data in such a group chat system is saved in the cloud; therefore, all previous data items can be browsed even in the case where a user joins a group midway through, or changes his or her communication terminal. This allows, even in the case where, for example, the user has been transferred to a new department or has joined a project midway through due to personnel changes, by reviewing the data exchanged in the past, he or she can easily grasp the state of the group in which he or she is now working.

In such a cloud-based group chat system, by encrypting communication channels, wiretapping on the communication channels is prevented, or as already described above, by not leaving data items on communication terminals, information leakage is prevented that would be caused by loss of a communication terminal and/or data improperly brought out of the premises. In this way, conventional group chat systems take countermeasures to deal with threats to "communication channels" and "communication terminals"; on the other hand, countermeasures to deal with threats to server devices are not sufficient.

As the threats to server devices mentioned here, "an attack against a server device by an external party", "an internal fraud committed by a server administrator", and the like may be enumerated. In order to deal with these threats, one may consider taking a measure of encrypting and saving messages. However, provided that a message can be decrypted on the server device side, there is still likelihood of leakage of the message from the server device with respect to the threats described above. It is important that messages transmitted to the server device that executes transmitting/receiving/saving data are kept concealed from the server device (so as not to be wiretapped on the server device side).

As one method, one may consider concealing messages from the server device and implementing end-to-end encrypted communication that can be decrypted only on communication terminals. In this case, how to share a key used among the communication terminals becomes a problem. As a solution to this problem, for example, Non-Patent Document 2 has been disclosed. In Non-Patent Document 2, in a star network that has an authentication server at the center, a protocol is proposed for sharing a key among users (hereafter, referred to as a shared key) without leaking any information to the authentication server.

This allows the users to exchange messages among their communication terminals while concealing messages to the server device. Also, a shared key is shared so as to make messages readable only on the currently participating communication terminals; therefore, the shared key is updated upon an event such as addition and deletion of a user.

RELATED ART DOCUMENTS

Non-Patent Documents

[Non-Patent Document 1] NTT Software, "A group chat for business: TopicRoom", [online], NTT Software, [searched on Sep. 28, 2017], Internet<URL:https://www.ntt-yx.co.jp/products/topicroom/index.html>

[Non-Patent Document 2] Tetsutaro Kobayashi, Kazuki Yoneyama, Reo Yoshida, Yuto Kawahara, Hitoshi Fuji, and Tomohide Yamamoto, "Scalable Dynamic Multi-Person Key Distribution Protocol"; SCIS 2016-Symposium on Cryptography and Information Security-Paper Collection, General Incorporated Association of Inst. of Electronics, January 2016, 4E2-3

SUMMARY OF INVENTION

Problem to be Solved by the Invention

According to the technique of Non-Patent Document 2 described above, by sharing a shared key among communication terminals that is kept undisclosed to a server device, messages can be exchanged while being concealed from the server device. However, in a communication system as described above, linked with update of the shared key, there are cases where additional processing is required on the server device, the load on the server device may be increased. In particular, in a system in which operations need to be executed in real time as in group chat systems, it is undesirable that processing on a server device takes a long time.

The present invention has been made in view of the above, and has an object to provide a technique that can reduce the load on a server device in a system in which messages are exchanged among communication terminals while concealing the messages to the server device.

Means for Solving the Problem

According to the disclosed technique, a server device is provided that is used in a communication system that executes transmission and reception of messages via the server device among a plurality of communication terminals forming a group to which a group identifier is assigned, while concealing the messages to the server device. The server device includes:

an encrypted message storage unit configured to save an encrypted text of a message generated by encrypting the message with a message key generated from a shared key shared among the plurality of communication terminals belonging to the group and the group identifier, by using a message key identifier as an identifier of the message key as a key;

an encrypted message key storage unit configured to save an encrypted text of the message key generated by encrypting the message key to be re-encryptable by using the shared key, by using the message key identifier as a key; and a re-encryption processing unit configured to receive, after the shared key has been updated, a re-encryption key from a communication terminal that has generated the re-encryption key by using the shared key and the updated shared key, use the re-encryption key to generate a re-encrypted encrypted text of the message key, and overwrite the encrypted text of the message key before re-encryption with the re-encrypted encrypted text of the message key to be saved, in the encrypted message key storage unit.

Advantage of the Invention

According to the disclosed technique, a technique can be provided that can reduce the load on a server device in a system in which messages are exchanged among communication terminals while concealing messages to the server device.

BRIEF DESCRIPTION OF DRAWINGS

FIG. 5 is a diagram for describing an outline of techniques according to the present invention;
FIG. 6 is a diagram for describing an outline of techniques according to the present invention;
FIG. 9 is a diagram illustrating an example of a data table in an encrypted message storage unit;
FIG. 10 is a diagram illustrating an example of a data table in an encrypted message key storage unit;
FIG. 15 is a flow chart for describing operations in an implementation example;
and
FIG. 16 is a sequence chart for describing operations in an implementation example.

EMBODIMENTS OF THE INVENTION

In the following, an embodiment according to the present invention will be described with reference to the drawings. The embodiment to be described below is merely an example, and an embodiment to which the present invention can be applied is not limited to the following embodiment.

(Related Techniques)

Upon describing an embodiment according to the present invention, first, assumed related techniques and their problems will be described. However, the problem to be solved by the present invention is not limited to the problems of the related technique described below.

According to the technique of Non-Patent Document 2 described earlier, by sharing a key among communication terminals that is kept undisclosed to a server device, messages can be exchanged while being concealed from the server device. However, in Non-Patent Document 2, the shared key is shared among only currently participating members; therefore, there are cases where the shared key is updated upon addition or deletion of a user, such as an event of login or logout of a user, or other than such an event, updated regularly. Therefore, in order to make messages that have been accumulated in the past readable only on currently participating communication terminals, it is necessary to update data saved on the server device in the past to be decryptable on the communication terminal side by using the updated shared key, without decrypting the data on the server device side. This will be referred to as re-encryption.

Figure 1:
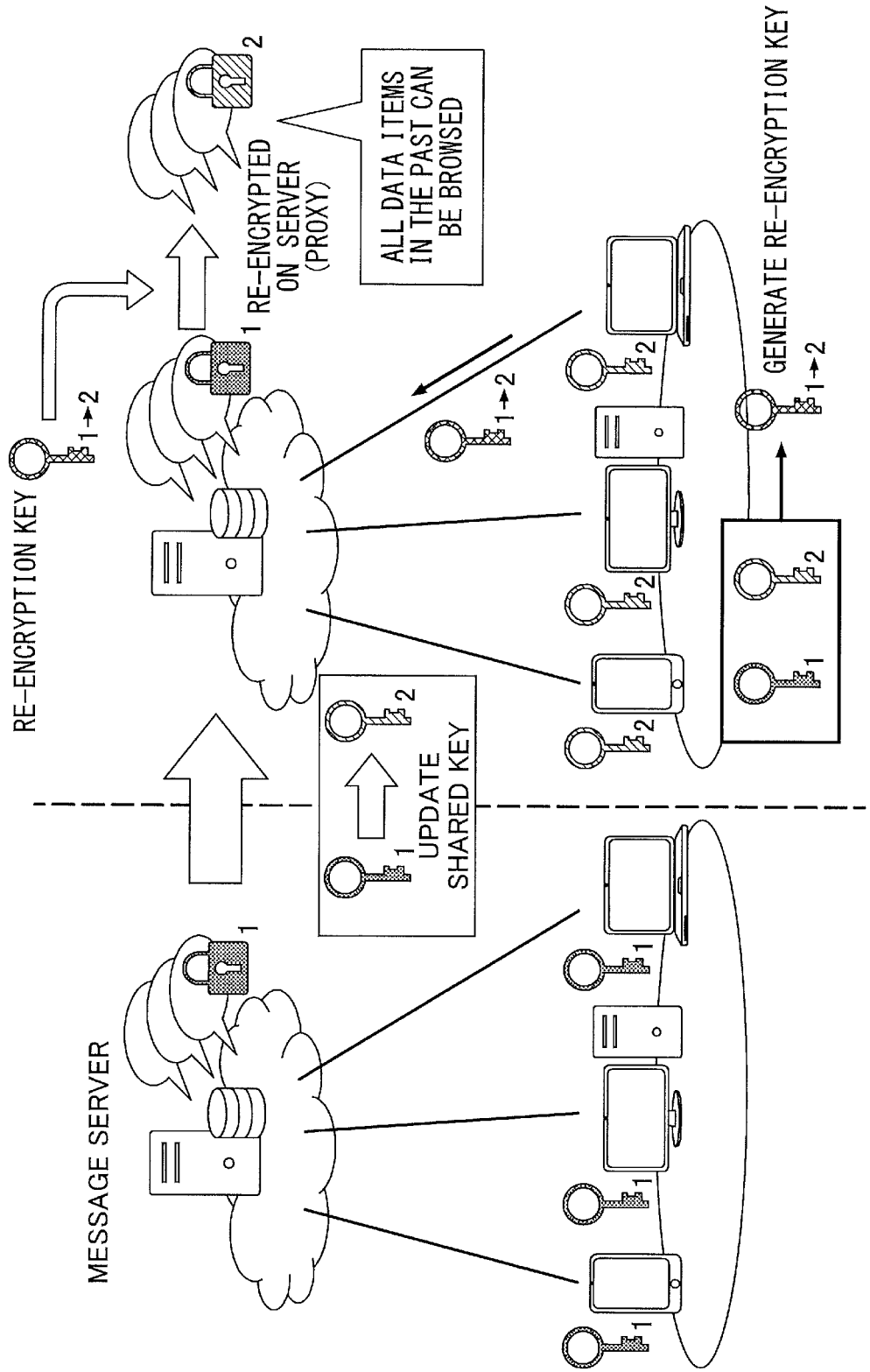
FIG. 1 is a diagram illustrating a related technique.

A related technique that is assumed for implementing this re-encryption will be described with reference to FIGS. 1 to 3. In the present related technique, as illustrated on the right-hand side in FIG. 1, after a shared key has been updated from a key 1 to a key 2, each communication terminal having both key 1 and key 2 generates a re-encryption key ("key 1→2"), and transmits the re-encryption key to a server device. The server device executes re-encryption by using the re-encryption key, the re-encrypted data can be decrypted by the updated key 2. A more detailed example will be described with reference to FIGS. 2 and 3.

Figure 2:
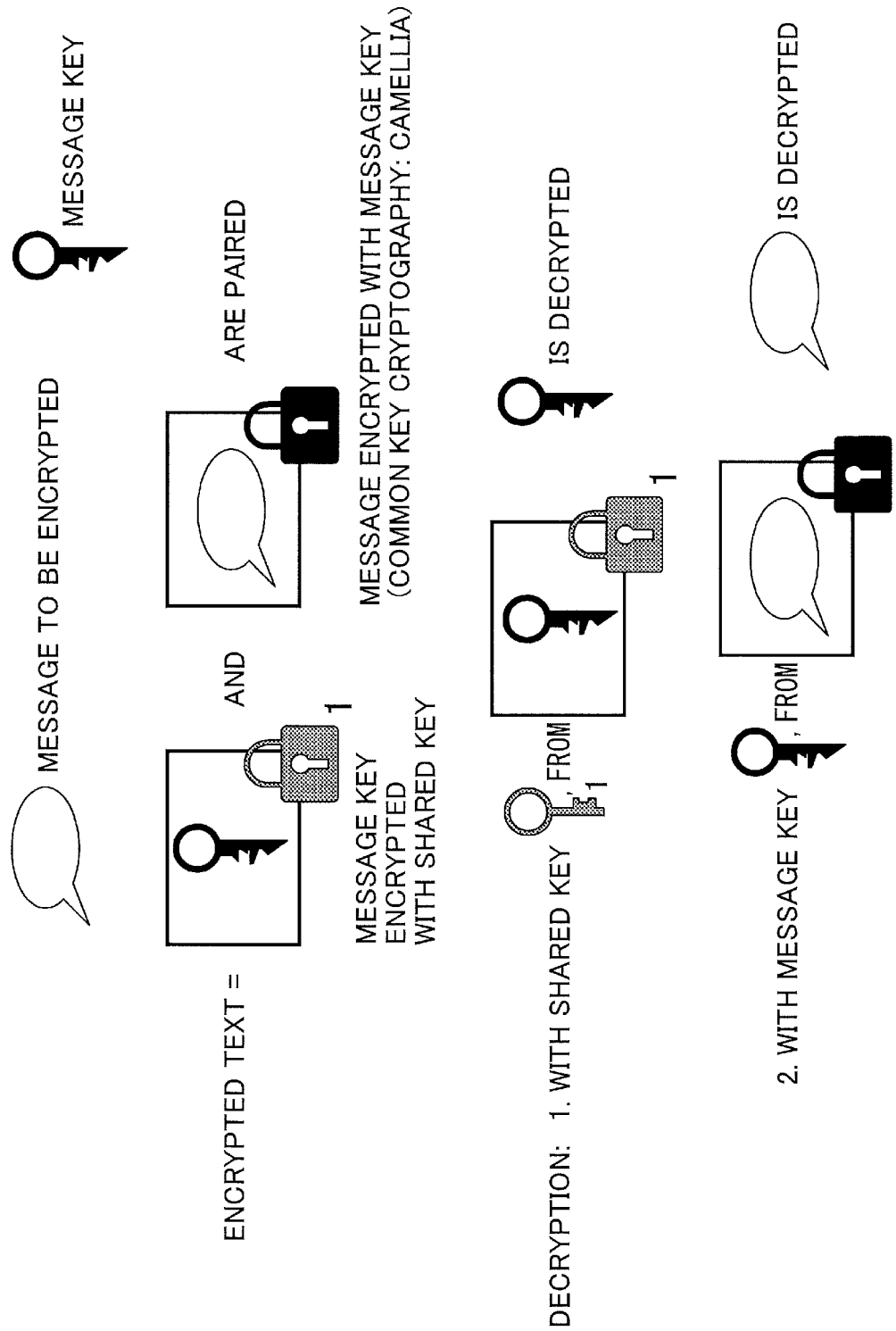
FIG. 2 is a diagram illustrating a related technique.

In the present related technique, as illustrated in FIG. 2, a message is encrypted with a message key by using common key cryptography such as Camellia, and at the same time, the message key is encrypted with a shared key, to generate an encrypted text in which the encrypted message key is combined with the encrypted message. Then, upon decryption, the message key is decrypted with the shared key, and the message is decrypted with the decrypted message key.

Figure 3:
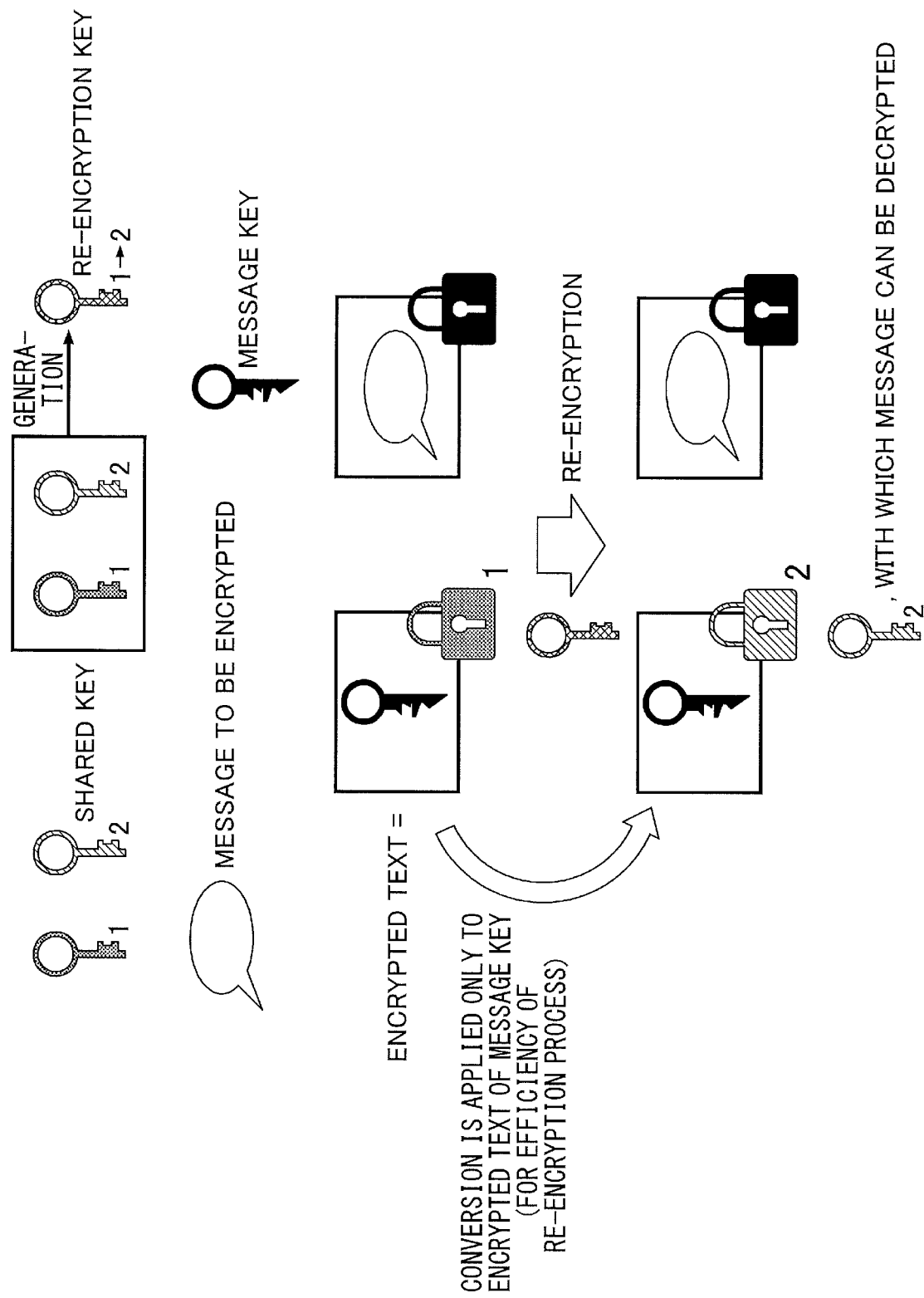
FIG. 3 is a diagram illustrating a related technique.

As illustrated in FIG. 3, re-encryption with a re-encryption key is applied only to the encrypted message key. Accordingly, re-encryption can be executed efficiently.

In the related technique presented, from the viewpoint of safety upon leakage of a message key, it is assumed that the message key is generated for each communication terminal used by a user. However, if the message key is generated for each communication terminal used by a user, processing time of re-encryption on a server device is proportional to the number of updates of the shared key times the number of users. Therefore, there is a problem that the load on the server device increases. In particular, in the case where there are a large number of people in a chat group, the effect of the increased load on the server device becomes greater.

(Outline of Technique According to the Present Invention)

In the technique according to the present invention, a message key can be used commonly by all users in the same chat group in accordance with the lifetime of the shared key. Accordingly, encrypted texts to be re-encrypted can be reduced, and thereby, the load on the server device can be reduced.

Figure 4:
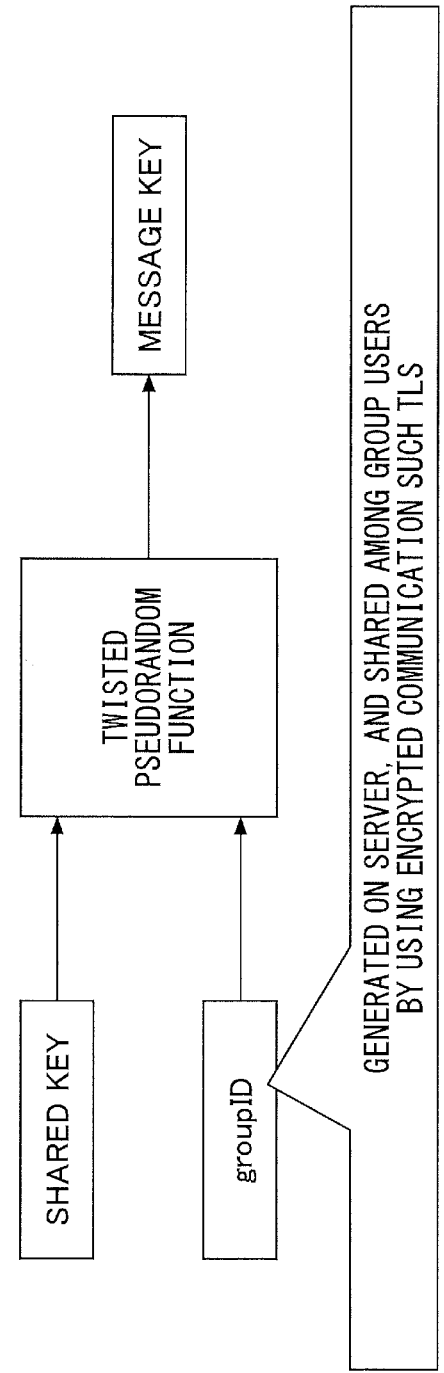
FIG. 4 is a diagram for describing an outline of techniques according to the present invention.

For this purpose, a message key is generated by mixing a shared key shared in a chat group, and a group identifier denoted as groupID shared among a server device and the chat group. More specifically, as an example, as illustrated in FIG. 4, in order to prevent the message key from leaking even if either of the shared key or groupID is leaked, these are mixed by using a twisted pseudorandom function (or a pseudorandom function).

In the technique according to the present invention, a message key is generated to be common in a group in accordance with an update of the shared key. Therefore, although in the related technique, the processing time of re-encryption depends on "the number of updates of a shared key until the current time" times "the number of users", in the technique according to the present invention, the processing time of re-encryption depends on "the number of updates of a shared key until the current time", and thereby, the processing time of re-encryption can be reduced significantly.

In other words, in the related technique, as illustrated in FIG. 5, the encrypted text of a message corresponds to the encrypted text of a message key one-to-one; therefore, for as many messages as there are, encrypted texts of message keys need to be re-encrypted, which results in a heavy load.

In contrast, in the technique according to the present invention, as illustrated in FIG. 6, multiple messages that share the same shared key are associated with one message key (identified by a key ID); therefore, the number of encrypted texts of message keys to be re-encrypted can be reduced significantly.

In the following, an implementation example according to the present invention will be described.

(Preparation in Advance)

First, preparation to be understood in advance for implementing operations described in the implementation example will be explained.

Let a set N be the set of all positive integers. Let $\text{Kspace}_1$ and $\text{Kspace}_2$ denote key spaces. A common key-based re-encryptable cryptographic scheme used in the implementation example is constituted with the following four algorithms: KEM·Enc, KEM·Dec, KEM·ReKeyGen, and KEM·ReEnc. In the following, each algorithm will be described. Note that an algorithm here may also be referred to as a "function".

$$\text{KEM·Enc}(SK_{i1}, K) \rightarrow C_1^{(i1)}$$

This algorithm takes as input an element $SK_{i1}$ in $\text{Kspace}_1$ and an element $K$ in $\text{Kspace}_2$, and outputs an encrypted text $C_1^{(i1)}$.

$$\text{KEM·Dec}(SK_j, C_1^{(i)}) \rightarrow K'$$

This algorithm takes as input an element SK in $\text{Kspace}_1$ and an encrypted text $C_1^{(i)}$, and outputs an element K in $\text{Kspace}_2$.

$$\text{KEM·ReKeyGen}(SK_{i1}, SK_{i2}) \rightarrow RK_{i1,i2}$$

This algorithm takes as input two elements $SK_{i1}$ and $SK_{i2}$ in $\text{Kspace}_1$, and outputs a re-encryption key $RK_{i1,i2}$.

$$\text{KEM·ReEnc}(RK_{i1,i2}, C_1^{(i1)}) \rightarrow C_1^{(i2)}$$

This algorithm takes as input a re-encryption key $RK_{i1,i2}$ and an encrypted text $C_1^{(i1)}$, and outputs a re-encrypted encrypted text $C_1^{(i2)}$.

Note that for the sake of convenience of notation of characters in the specification, although a subscript is written as "i1", such as "$SK_{i1}$", this means "$i_1$". In the present specification, for a subscript of a subscript, substantially the same way of notation is used. For example, a subscript "K1" of "$ID_{K1}$" that will be described later is intended to be "$K_1$".

The algorithms described above are assumed to satisfy the following two conditions.

Condition 1: for any element SK in $\text{Kspace}_1$ and any element K in $\text{Kspace}_2$, KEM·Dec(SK, KEM·Enc(SK, K))=K Condition 2: for a sequence of re-encryption keys $RK_{1,2}, \ldots, RK_{n-1,n}$ each output by KEM·ReKeyGen($SK_i$, $SK_{i+1}$) for any integer n>1, any sequence of keys $SK_1, \ldots, SK_n$ in $\text{Kspace}_1$, and any $i \in \{1, \ldots, n-1\}$; any element K in $\text{Kspace}_1$; and any $i_1$ and $i_2$ that satisfy $1 \leq i_1 < i_2 \leq n$, KEM·Dec($SK_{i2}$, KEM·ReEnc($RK_{i2-1,i2}$, ..., KEM·ReEnc($RK_{i1,i1+1}$, KEM·Enc($SK_{i1}$, K))))=K As an example of a re-encryption scheme that satisfies the above conditions, a scheme in Reference 1 can be considered. Note that titles of references are collectively listed at the end of the specification.

This is constructed as follows. First, let q be a prime number, and $Z_q$ be a residue class ring modulus q with respect to the integer ring Z. Let G be a cyclic group of an order q, and $\text{Kspace}_2$=G. Here, although the cyclic group G is considered as a multiplicative group, it may be considered as an additive group. Also, let $\text{Kspace}_1$=$Z_q$. Further, let Rand be a space of random numbers, and let H:Rand→G be a hash function having Rand as the domain and G as the range. A function F:Kspace×Rand→G having a direct product of $\text{Kspace}_1$=$Z_q$ and Rand as the domain and G as the range, is defined as F(SK, r)=H(r)$^{SK}$.

$$\text{KEM·Enc}(SK_{i1}, K) \rightarrow C_1^{(i1)}$$

This function extracts r∈Rand as a uniform random number, and outputs $C_1^{(i1)}$=(r, K+F(SK, r)).

$$\text{KEM·Dec}(SK_j, C_1^{(i)}) \rightarrow K'$$

This function decomposes $C_1^{(i)}$=(r, C), and outputs K'=C−F(SK, r).

$$\text{KEM·ReKeyGen}(SK_{i1}, SK_{i2}) \rightarrow RK_{i1,i2}$$

This function outputs $RK_{i1,i2}$=$SK_{i2}$−$SK_{i1}$.

$$\text{KEM·ReEnc}(RK_{i1,i2}, C_1^{(i1)}) \rightarrow C_1^{(i2)}$$

This function decomposes $C_1^{(i1)}$=(r, C), and outputs $C_1^{(i2)}$=(r, C+F($RK_{i1,i2}$, r)).

Note that as an example of the re-encryptable cryptographic scheme (KEM·Enc, KEM·Dec, KEM·ReKeyGen, KEM·ReEnc), although the technique disclosed in Reference 1 is taken, the re-encryptable cryptographic scheme may be implemented by a method other than the above, and the re-encryptable cryptographic scheme is not limited to any particular method.

The common key cryptography used in the implementation example is constituted with the following two algorithms (Enc, Dec), each having the following input and output.

$$\text{Enc}(K, m) \rightarrow C_2$$

This algorithm takes as input an element K in $\text{Kspace}_2$ and a message m, and outputs an encrypted text $C_2$.

$$\text{Dec}(K, C_2) \rightarrow m$$

This algorithm takes as input an element K in $\text{Kspace}_2$ and an encrypted text $C_2$, and outputs a message m.

The algorithms described above are assumed to satisfy the following condition.

For any element K in $\text{Kspace}_2$ and any message m, Dec(K, Enc(K, m))=m

As an example of a cryptographic scheme that satisfies the above, although AES, Camellia, and the like may be enumerated, the scheme is not limited to a particular method.

Let k be a security parameter; let $\text{Dom}_k$ and $\text{Rng}_k$ be spaces whose sizes depend on k; and let F={$F_s$:

$Dom_k \to Rng_k\}_{s \in \{0, 1\}^k}$ be a family of functions. If it is difficult for any polynomial-time identifier D to distinguish this family of functions from a family of random functions $RF_k=\{f:Dom_k \to Rng_k\}$, the family of functions F is called a family of pseudorandom functions, and an element thereof is called a pseudorandom function. Examples of pseudorandom functions are described in Reference 2.

Let $FS_k$ be a key space dependent on k, and for a pseudorandom function $F_s:\{0, 1\}^k \times FS_k \to Rng_k$, a twisted pseudorandom function $tPRF:\{0, 1\}^k \times FS_k^2\{0, 1\}^k \to Rng_k$ is defined as follows:

$$tPRF(a,a',b,b'):=F_s(a,b) \oplus F_s(b',a') \quad \text{[Formula 1]}$$

Note that the following symbol denotes operation of exclusive OR.

$$\oplus \quad \text{[Formula 2]}$$

As taken in Reference 3, it has been understood that an output value of a twisted pseudorandom function cannot be distinguished from a number selected as a uniform random number, even if the input (a, a') or (b, b') is leaked.

(System Configuration)

Figure 7:
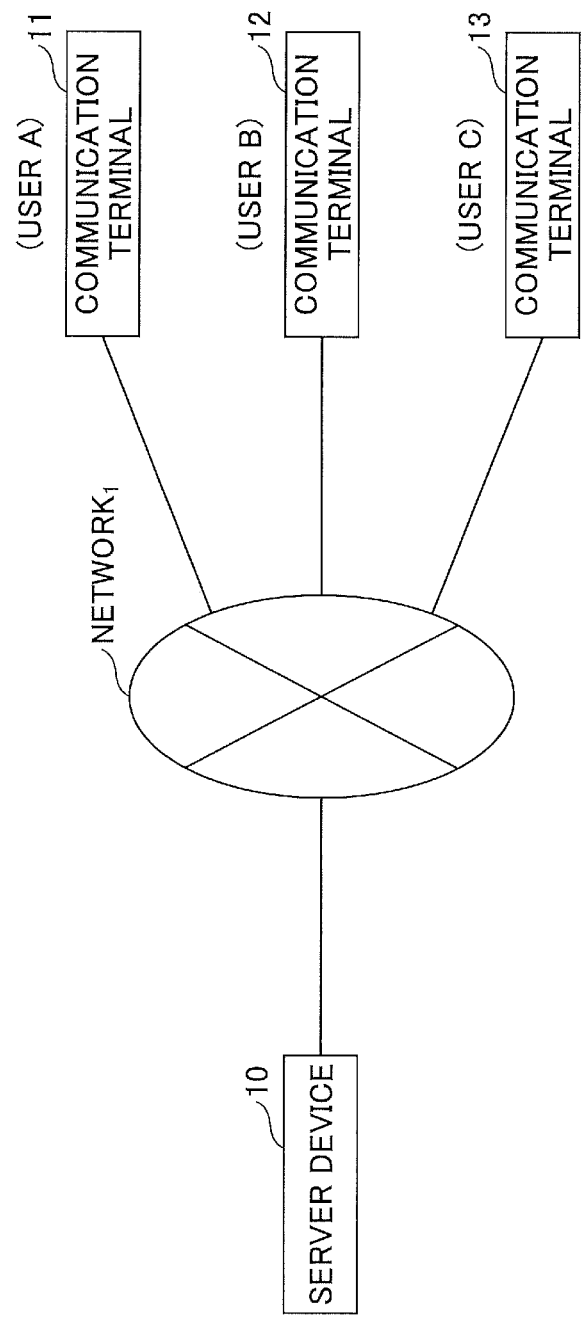
FIG. 7 is a block diagram illustrating a configuration of a communication system in an implementation example.

Next, a system configuration of the implementation example will be described. FIG. 7 is a diagram illustrating a configuration of a communication system in the present implementation example.

As illustrated in FIG. 7, this communication system includes a server device 100 and communication terminals 11, 12, and 13. These devices are communicably connected via a network 1. Each of the communication terminal 11, communication terminal 12, and communication terminal 13 is, for example, a personal computer, a smartphone, or the like, but are not limited to any particular type of device. As illustrated in FIG. 7, assume that a user A uses the communication terminal 11, a user B uses the communication terminal 12, and a user C uses the communication terminal 13.

In the communication system of the present implementation example, the communication terminal 11, communication terminal 12, and communication terminal 13 can form a group of users that exchange chat messages. Note that a "chat" message as the message to be exchanged is merely an example, and messages of applications other than "chat" can also be exchanged.

(Device Configurations)

In the following, functional configurations of the respective devices will be described. Specific processing operations of functional units of each device will be described later with reference to a sequence chart and a flow chart in an operation example.

Figure 8:
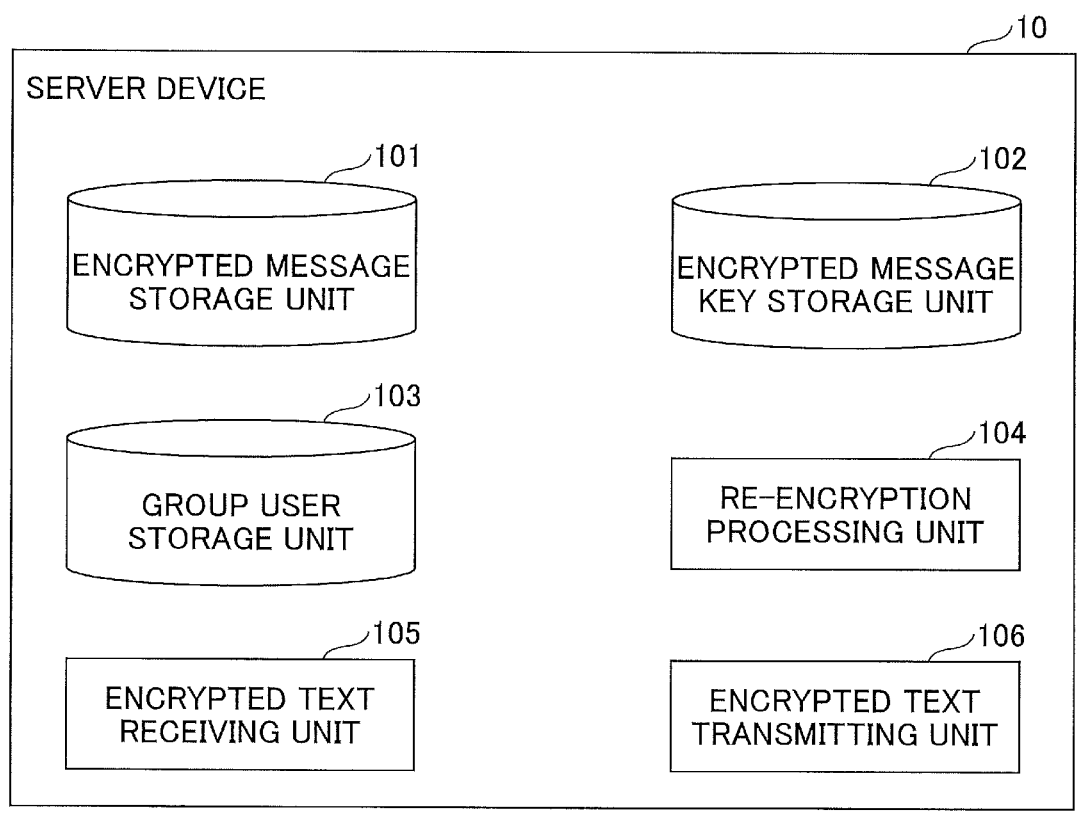
FIG. 8 is a block diagram illustrating a configuration of a server device in an implementation example.

FIG. 8 is a block diagram illustrating a configuration of the server device 100. As illustrated in FIG. 8, the server device 100 includes an encrypted message storage unit 101 to save a pair of encrypted text of a message and message key identifier; an encrypted message key storage unit 102 to save a pair of encrypted text of a message key and message key identifier; a group user storage unit 103 to save user information for each group; a re-encryption processing unit 104; an encrypted text receiving unit 105; and an encrypted text transmitting unit 106.

The re-encryption processing unit 104 is a processing unit to generate, in response to receiving a re-encryption key from a communication terminal, from an encrypted text of a message key and the re-encryption key, a new encrypted text of the message key from which the encrypted text of the message key can be decrypted with the updated shared key.

As illustrated in FIG. 9, in the encrypted message storage unit 101 of the server device 100, encrypted texts of messages are associated with message key identifiers (one message key is used for multiple messages) and stored. Also, as illustrated in FIG. 10, in the encrypted message key storage unit 102, a message key identifier is associated with an encrypted text of a message key and stored. Note that FIG. 10 illustrates a state before and after re-encryption.

Figure 11:
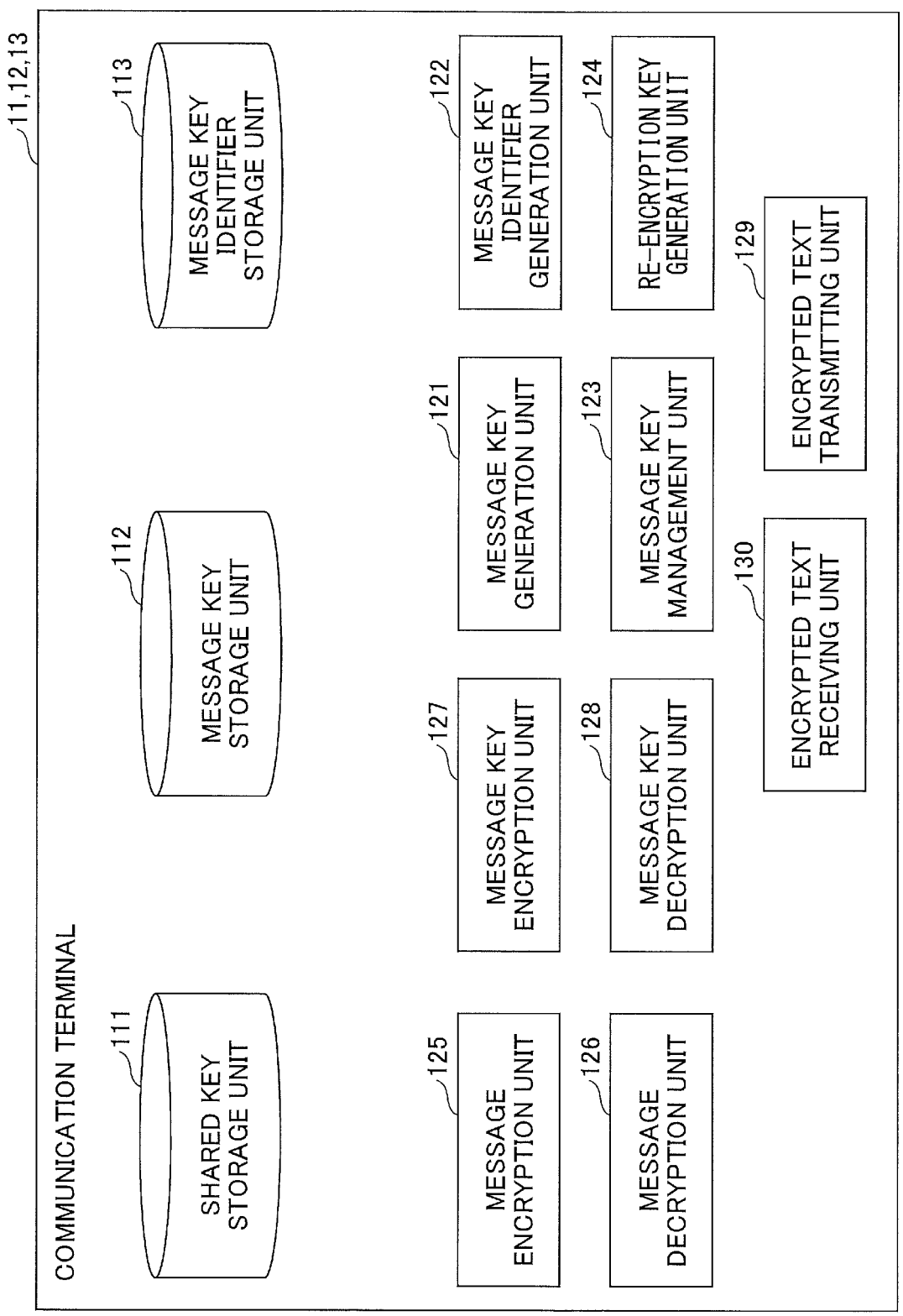
FIG. 11 is a block diagram illustrating a configuration of a communication terminal in an implementation example.

FIG. 11 is a block diagram illustrating a configuration of the communication terminals 11, 12, and 13. As illustrated in FIG. 11, each of the communication terminals 11, 12, and 13 includes a shared key storage unit 111 to save a shared key; a message key storage unit 112 to save a message key; a message key identifier storage unit 113 to save a message key identifier; a message key generation unit 121 to generate a message key from a shared key and a group identifier; a message key identifier generation unit 122 to generate a message key identifier from a message key; a message key management unit 123 to determine whether a message to be transmitted is the first message after updating a shared key; a re-encryption key generation unit 124 to generate a re-encryption key from a shared key before update and the shared key after update when the shared key is updated; a message encryption unit 125 to generate an encrypted text of a message from a message key and the message based on common key cryptography; a message decryption unit 126 to decrypt a messages from a message key and an encrypted text of the message, based on the common key cryptography; a message key encryption unit 127 to generate an encrypted text of a message key from a shared key and the message key, based on re-encryptable common key cryptography; a message key decryption unit 128 to decrypt a message key from a shared key and an encrypted text of the message key, based on the re-encryptable common key cryptography; an encrypted text transmitting unit 129; and an encrypted text receiving unit 130.

In the present implementation example, the communication terminals 11, 12, and 13 are assumed to have the same functional configuration. However, an alternative system configuration may be adopted in which a certain communication terminal does not include the re-encryption key generation unit 124, whereas another communication terminal includes the re-encryption key generation unit 124.

Any one of the server device 100 and the communication terminals 11, 12, and 13 can be implemented by executing a program corresponding to the processing executed on the device using hardware resources such as a CPU and a memory built in the computer. The program can be recorded on a computer-readable recording medium (a portable memory, or the like), to be saved or delivered. Also, it is also possible to provide the program described above via a network such as the Internet or e-mail.

Figure 12:
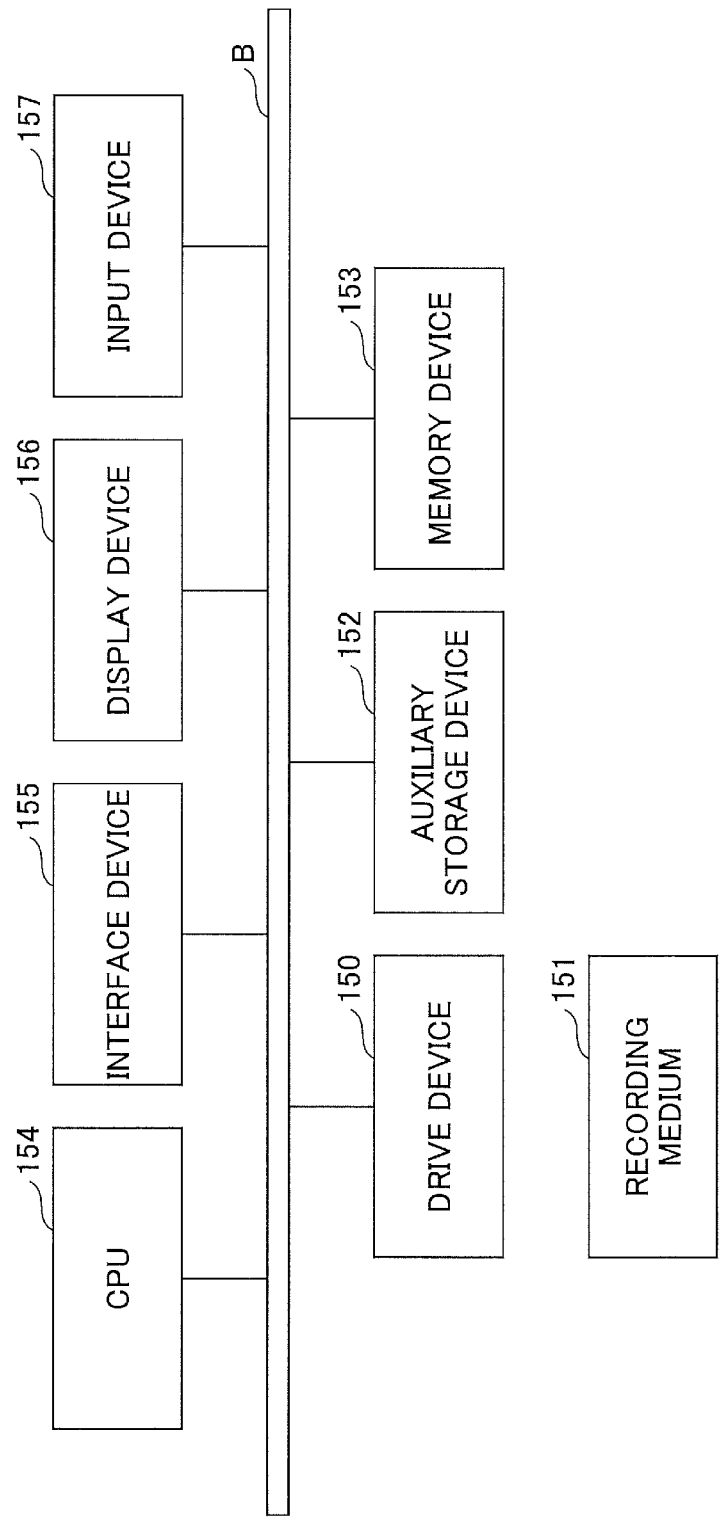
FIG. 12 is a diagram illustrating an example of a hardware configuration of devices.

FIG. 12 is a diagram illustrating an example of a hardware configuration of the computer described above. The computer in FIG. 12 includes a drive device 150, an auxiliary storage device 152, a memory device 153, a CPU 154, an interface device 155, a display device 156, an input device 157, and the like; these units are mutually connected via a bus B.

A program for implementing processing on the computer is provided with a recording medium 151, for example, a CD-ROM, memory card, or the like. When the recording medium 151 on which the program is recorded is set in the drive device 150, the program is installed in the auxiliary storage device 152 from the recording medium 151 via the drive device 150. However, installation of the program does not need not be executed with the recording medium 151, and may be downloaded from another computer via the network. The auxiliary storage device 152 stores the installed program, and stores necessary files, data, and the like.

The memory device 153 reads and stores the program from the auxiliary storage device 152, in the case of receiving a start command of a program. The CPU 154 implements functions related to the device, according to a program stored in the memory device 153. The interface device 155 is used as an interface for connecting to a network, and functions as an input unit and an output unit via the network. The display device 156 displays a GUI (Graphical User Interface) or the like by the program. The display device 156 is also an example of an output unit. The input device 157 is constituted with a keyboard and a mouse, buttons, or a touch panel or the like, and used for receiving various operating commands as input.

In the following, operations of the communication system according to the present implementation example will be described in detail.

(System Operations)
<Group Identifier and Shared Key>

As described earlier, the communication terminals in the present implementation example form a group of users who exchange chat messages. Each group is given an identifier.

As illustrated in FIG. 7, assume that the users of the communication terminal 11, communication terminal 12, and communication terminal 13 are the user A, user B, and user C, respectively. Assume that the user A, user B, and user C belong to a group having a group identifier of groupID, and assume that each communication terminal saves groupID in the memory or the like.

Note that although the method of generating groupID is not limited to a particular method, it is desirable that groupID is generated by the server device 10 using a pseudo-random number generator. Also, it is desirable that groupID is not disclosed to a party other than the users belonging to this group (including A, B, and C) and the server device 10. Therefore, for example, when the server device 10 is going to share groupID with the communication terminals, groupID is concealed using an encrypted communication protocol such as TLS, and transmitted.

Next, a shared key used in the implementation example will be described. A shared key refers to a key generated for each group, and shared among communication terminals used by users belonging to the group. As a protocol for sharing a key without leaking any information to a party other than the communication terminals, for example, to the server device 10, for example, a method described in Reference 3 may be considered; however the method of sharing a shared key is not limited to a particular method.

Note that in the present implementation example, in order to safely share a shared key, a shared key is generated each time a user is added to the group; a user leaves the group; a certain period of time has elapsed; and a user logs in or logs out. However, these are merely examples, and the timing at which a shared key is generated may be other than these timings. Hereafter, a set of group identifiers of groupID is denoted as GID.

In the following, assume that $Kspace=Kspace_1=Kspace_2=GID$.

(Sequence of Operations)

In the following, operations of the communication system in the present implementation example will be described, along steps illustrated in sequence charts and flow charts in FIGS. 13 to 16.

<Generation of Shared Key and Message Key>

Figure 13:
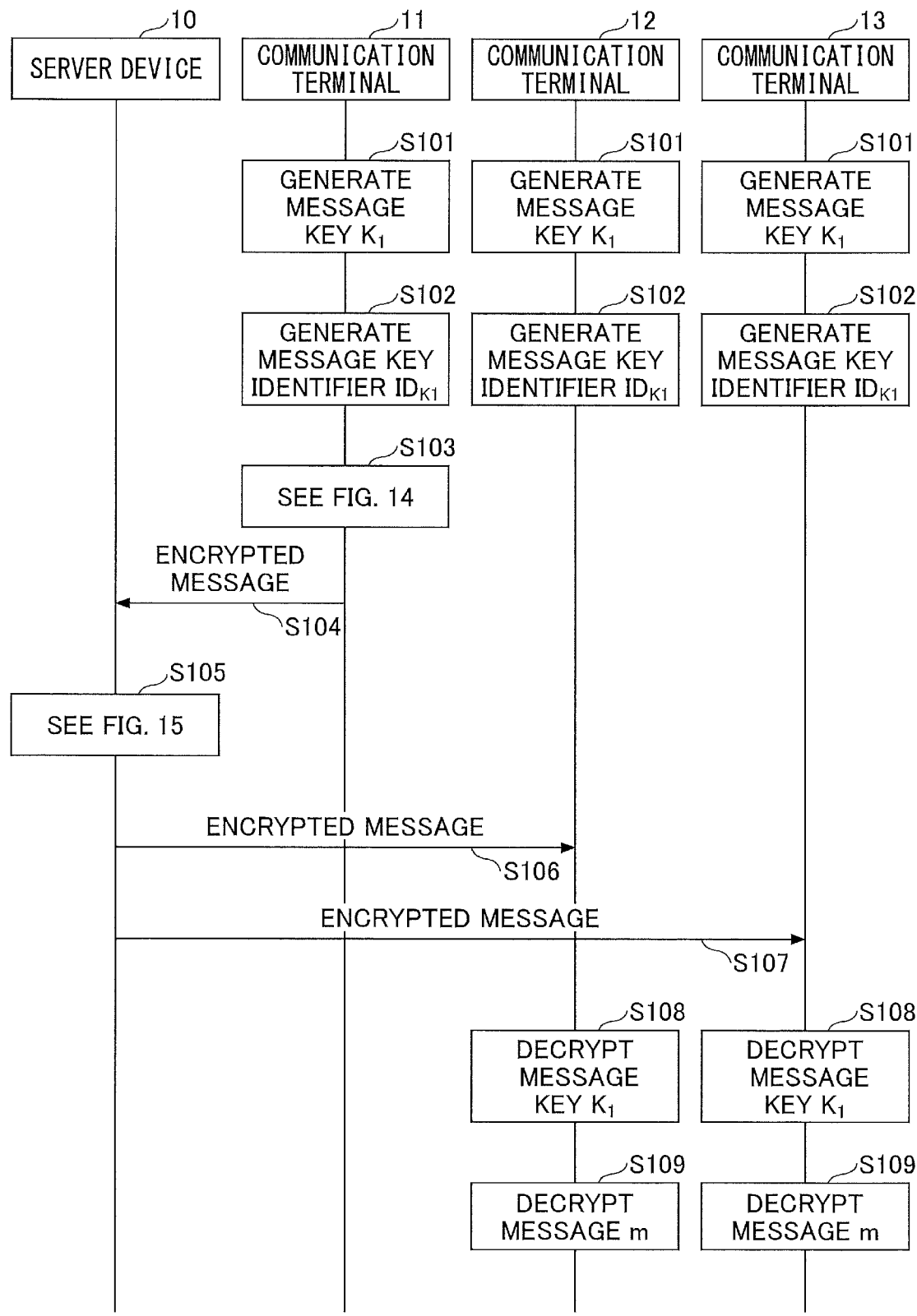
FIG. 13 is a sequence chart for describing operations in an implementation example.

As a prerequisite for operations illustrated in FIG. 13, assume that the users A, B, and C are logged in on a group chat system, by using the communication terminal 11, communication terminal 12, and communication terminal 13, respectively. Also, assume that a shared key $SK_1$ has been generated in a group of groupID to which the communication terminal 11, communication terminal 12, and communication terminal 13 belong. Assume that the space of shared keys is $Kspace_1=Kspace$. Assume that the communication terminals 11, 12, and 13 save the shared key $SK_1$ in the respective shared key storage units 111.

Here, let $F_s:Kspace_2 \rightarrow Kspace$ be a pseudorandom function. Assume that a seed $s \in \{0, 1\}^k$ is shared in advance among the communication terminals 11, 12, and 13. Note that $\{0, 1\}^k$ denotes a set of binary sequences having a length of k bits.

At S101 in FIG. 13, on each of the communication terminals 11, 12, and 13, the message key generation unit 121 calculates a message key $K_1:=F_s(groupID, SK_1)$. The message key $K_1$ is saved in the message key storage unit 112.

This message key may be generated by a twisted pseudorandom function instead of the pseudorandom function. For example, it may be generated as $K_1:=tPRF(groupID, SK_1, SK_1)$.

At S102, on each of the communication terminals 11, 12, and 13, the message key identifier generation unit 122 generates a message key identifier $ID_{K1}$ for $K_1$. Assume that $ID_{K1}$ is generated to be the same value on each communication terminal. As the method of generating $ID_{K1}$, for example, there is a method that uses the SHA256 hash function, inputs $K_1$ into the SHA256 hash function, and sets the output value as $ID_{K1}$. However, the method of generating $ID_{K1}$ is not limited to a particular method.

The communication terminals 11, 12, and 13 save $ID_{K1}$ in the respective message key identifier storage units 113.

<Transmission of Message>

In the present implementation example, assume that the user A uses the communication terminal 11 to transmit a message m to the group of groupID (S103 and S104 in FIG. 13). Note that at this point in time, assume that the communication terminal 11 has generated the message key $K_1$ and its identifier $ID_{K1}$.

Figure 14:
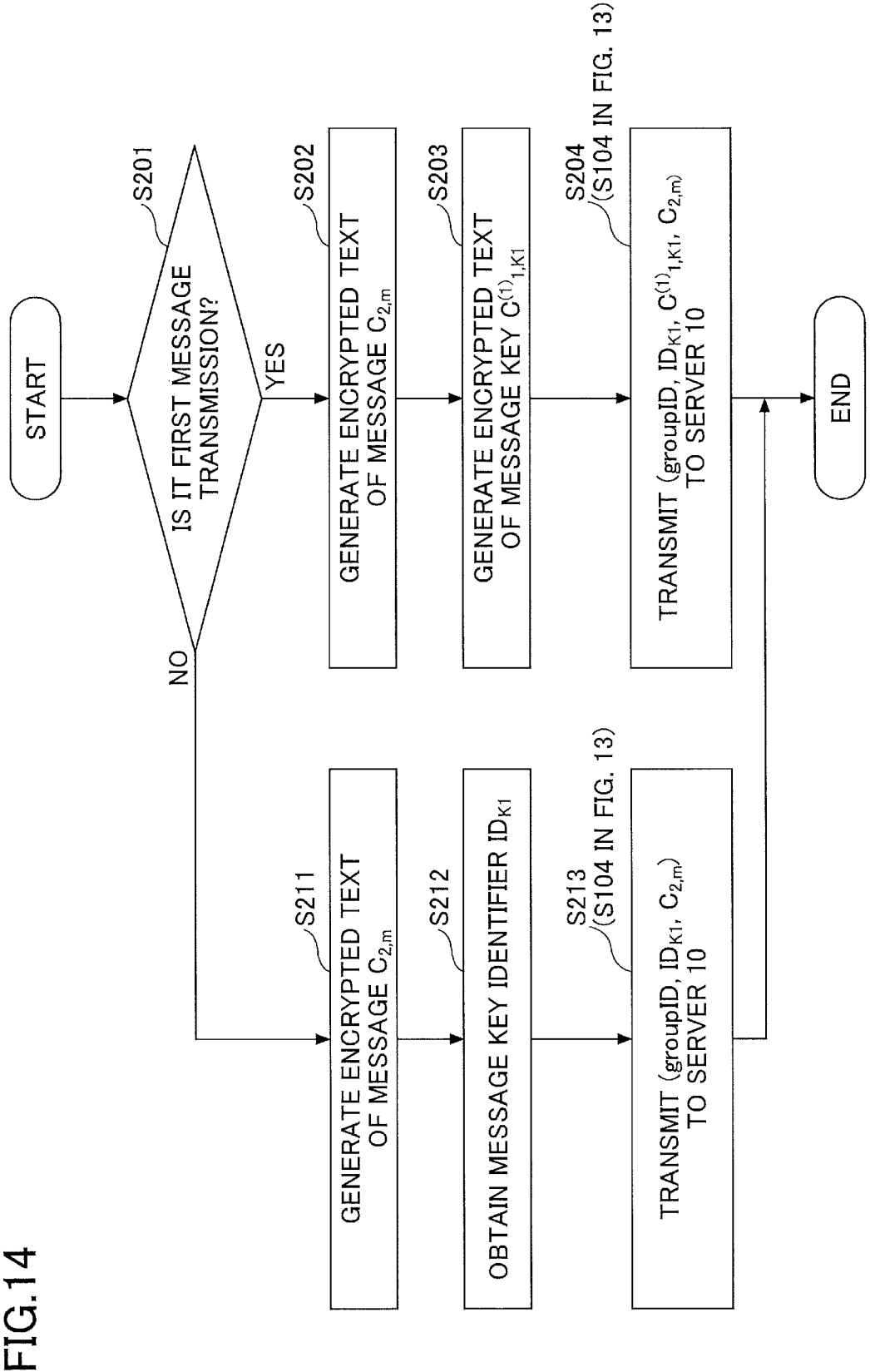
FIG. 14 is a flow chart for describing operations in an implementation example.

Processing contents at S103 and S104 in FIG. 13 will be described with reference to a flow chart in FIG. 14.

When the communication terminal 11 transmits the message m, first, at S201, the message key management unit 123 determines whether the message to be transmitted is the first message transmitted from the communication terminal 11 after the shared key $SK_1$ was generated.

If the determination result at S201 is YES, the process proceeds to S202, and the message encryption unit 125 of the communication terminal 11 generates an encrypted text of the message m as $C_{2,m} \leftarrow Enc(K_1, m)$.

Also, at S203, the message key encryption unit 127 generates an encrypted text of the message key as $C^{(1)}_{1,K1} \leftarrow KEM \cdot Enc(SK_1, K_1)$.

Then, at S204, the encrypted text transmitting unit 129 transmits $(groupID, ID_{K1}, C^{(1)}_{1,K1}, C_{2,m})$ to the server device 10. The encrypted text receiving unit 105 of the server device 10 receives the transmitted $(groupID, ID_{K1}, C^{(1)}_{1,K1}, C_{2,m})$. $K_1$ and m are expressed for the sake of convenience to distinguish $(C^{(1)}_{1,K1}, C_{2,m})$ from encrypted texts of other messages and other message keys, and $K_1$ and m are not immediately inferred from the encrypted text.

If the determination result at S201 is NO, the process proceeds to S211, and the message encryption unit 125 of the communication terminal 11 generates an encrypted text of the message m as $C_{2,m} \leftarrow \text{Enc}(K_1, m)$. The encrypted text transmitting unit 129 of the communication terminal 11 retrieves the message key identifier $\text{ID}_{K1}$ from the message key identifier storage unit 113 at S212, and transmits (groupID, $\text{ID}_{K1}$, $C_{2,m}$) to the server device 10 at S213. The transmitted (groupID, $\text{ID}_{K1}$, $C_{2,m}$) is received by the encrypted text receiving unit 105 of the server device 10.

<Delivery of Message>

Once having received the encrypted message described above from the communication terminal 11, the server device 10 executes processing for delivery at S105 to S107 in FIG. 13. Note that here, although delivery operations to the other communication terminals are triggered by the reception of the message, this is merely an example. The server may deliver a saved encrypted message to a communication terminal, in response to addition or login of a user, or other requests from a communication terminal.

The operations at S105 to S107 in FIG. 13 will be described with reference to a flow chart in FIG. 15.

First, the server device 10 determines the format of the message that has been transmitted from the communication terminal 11 and received by the encrypted text receiving unit 105 of the server device 10.

If the format of the message transmitted from the communication terminal 11 is (groupID, $\text{ID}_{K1}$, $C^{(1)}_{1,K1}$, $C_{2,m}$), the process proceeds to S302, and ($\text{ID}_{K1}$, $C_{2,m}$) is saved in the encrypted message storage unit 101.

Also, at S303, the server device 10 saves ($\text{ID}_{K1}$, $C^{(1)}_{1,K1}$) in the encrypted message key storage unit 102. Note that if a message is received from another communication terminal and ($\text{ID}_{K1}$, $C^{(1)}_{1,K1}$) has already been saved, the message is not saved here.

At S304 (S106 and S107 in FIG. 13), the encrypted text transmitting unit 106 of the server device 10 retrieves information (e.g., destination address) on the users (including the users B and C) belonging to the group of groupID saved in the group user storage unit 103, and by using the information, transmits ($C^{(1)}_{1,K1}$, $C_{2,m}$) to each user. Note that in the present implementation example, the encrypted text transmitting unit 106 of the server device 10 transmits ($C^{(1)}_{1,K1}$, $C_{2,m}$) to the communication terminal 12 and the communication terminal 13.

As a result of determination at S301, if the format of the message transmitted from the communication terminal 11 is (groupID, $\text{ID}_{K1}$, $C_{2,m}$), the process proceeds to S311. At S311, the server device 10 saves ($\text{ID}_{K1}$, $C_{2,m}$) in the encrypted message storage unit 101.

Next, the encrypted text transmitting unit 106 of the server device 10 retrieves the encrypted message key $C^{(1)}_{1,K1}$ associated with $\text{ID}_{K1}$ from the encrypted message key storage unit 102 at S312; retrieves information on the users (including the users B and C) belonging to the group of groupID saved in the group user storage unit 103, and by using the information, transmits ($C^{(1)}_{1,K1}$, $C_{2,m}$) to each user at S313. Note that in the present implementation example, the server device 10 transmits ($C^{(1)}_{1,K1}$, $C_{2,m}$) to the communication terminal 12 and the communication terminal 13.

<Reception of Message>

Next, reception of message will be described. Assume that a shared key shared by the chat group is $SK_2$ at this point in time. Although each of the communication terminals 12 and 13 receives a pair of encrypted text of the message key and encrypted text of the message ($C^{(2)}_{1,K1}$, $C_{2,m}$), only operations on the communication terminal 12 will be described with reference to FIG. 13. Substantially the same operations are executed on the communication terminal 13. Note that the message key $K_1$ used here is not necessarily a message key generated with the shared key $SK_2$.

Once the encrypted text receiving unit 130 of the communication terminal 12 receives ($C^{(2)}_{1,K1}$, $C_{2,m}$) from the server device 10 at S106 in FIG. 13, then, at S108, the message key decryption unit 128 retrieves the latest shared key $SK_2$ from the shared key storage unit 111, and calculates $K_1 \leftarrow \text{KEM·Dec}(SK_2, C^{(2)}_{1,K1})$ to decrypt the message key $K_1$.

Thereafter, at S109, the message decryption unit 126 uses the message key $K_1$ decrypted at S108, to calculate $m \leftarrow \text{Dec}(K_1, m)$ so as to decrypt the message m. This enables the communication terminal 12 to correctly display the message m transmitted from the communication terminal 11.

<Update of Shared Key and Generation of Re-Encryption Key>

Operations of updating a shared key and of generating a re-encryption key will be described with reference to a sequence chart in FIG. 16. Here, shared keys before and after an update are denoted as $SK_a$ and $SK_b$, respectively.

At S401, assume that the shared key used for encrypting a message key has been updated from $SK_a$ to $SK_b$ in the group of groupID to which the communication terminal 11, communication terminal 12, and communication terminal 13 belong. At this time, the communication terminal 11, communication terminal 12, and communication terminal 13 share the latest shared key $SK_b$, and hold the shared key $SK_b$ in the respective shared key storage units 111.

Also, assume that the communication terminal 13 also holds the shared key $SK_a$ before the update in the shared key storage unit 11. Note that the shared keys $SK_a$ and $SK_b$ are undisclosed to the server device 10.

Also, assume that the server device 10 holds encrypted texts associated with groupID, namely, the encrypted texts of message keys $C^{(a)}_{1,Ki1}, \ldots, C^{(a)}_{1,Kin}$ that have been transmitted to the group of groupID, in the encrypted message key storage unit 102. Note that here, $i_1, \ldots, i_n$ subscripts for distinguishing message keys one another, used for describing the present implementation example. For example, the example illustrated in FIG. 10 illustrates that $K_1$, $K_2$, and $K_3$ have been used as the message keys.

At S402, the re-encryption key generation unit 124 of the communication terminal 13 calculates $RK_{a,b} \leftarrow \text{KEM·ReyGen}(SK_a, SK_b)$ to generate a re-encryption key $RK_{a,b}$. At S403, the encrypted text transmitting unit 129 (or any other functional unit for transmission) of the communication terminal 13 transmits a pair of group identifier and re-encryption key (groupID, $RK_{a,b}$) to the server device 10.

<Re-Encryption>

At S403, the encrypted text receiving unit 105 of the server device 10 (or any other functional unit for reception) receives the pair of group identifier and re-encryption key (groupID, $RK_{a,b}$) from the communication terminal 13.

Next, the re-encryption processing unit 104 repeatedly executes the following processing at S404 to S406 for each $j \in \{i_1, \ldots, i_n\}$.

The re-encryption processing unit 104 retrieves the encrypted text of the message key $C^{(a)}_{1,K}$ from the encrypted message key storage unit 102 at S404; executes $C^{(b)}_{1,Kj} \leftarrow \text{KEM·ReEnc}(RK_{a,b}, C^{(a)}_{1,Kj})$, and calculates an encrypted text of the message key $C^{(b)}_{1,Kj}$ after re-encryption at S406.

The re-encryption processing unit 104 overwrites the encrypted text of the message key $C^{(a)}_{1,Kj}$ with the re-encrypted encrypted text of the message key $C^{(b)}_{1,Kj}$ to be saved, in the encrypted message key storage unit 102 at S405. FIG. 10 illustrates overwriting with the encrypted text of the re-encrypted message key $C^{(b)}_{1,Kj}$ to be saved.

As illustrated in FIG. 10, after this processing, each message key identifier remains unchanged. Therefore, the correspondence between an encrypted text of a message in the encrypted message storage unit 101 and an encrypted text of a corresponding message key in the encrypted message key storage unit 102 remains unchanged. After the processing described above, a communication terminal that has received the encrypted text associated with groupID delivered from the server device 10 can decrypt each message correctly by the same operations as executed when the message was received, as long as holding the latest shared key $SK_b$.

(Effects and the Like of Implementation Example)

As described above, in the present implementation example, there is a group identifier that is a unique ID for each group, and the group identifier is shared in advance among the server device and the users that are present in the group.

A common key cryptography is used for encrypting a message, and a message key used for encrypting the message is encrypted with a shared key by using a common key-based re-encryptable cryptographic scheme. In the present implementation example, instead of generating a message key upon encrypting each message, a message key obtained as the output a pseudorandom function or a twisted pseudorandom function taking as input the shared key and the group identifier, is commonly used in the group. Accordingly, the message key will not be leaked even if either of the shared key or the group identifier is leaked; therefore, all users in the group can safely share the message key.

The server device saves an encrypted text of a message and an encrypted text of a corresponding message key in separate tables (e.g., FIG. 9 and FIG. 10), and at this time, in order to enable the server device to recognize which key is being used around for which message, an identifier of the key (key ID) is added and saved in a separate table.

As has been already described, when executing a re-encryption process, the server device only updates the table in which encrypted texts of message keys are saved (e.g., FIG. 10). The number of encrypted texts of message keys to be re-encrypted is equivalent to the number of updates of the shared key up to the present; therefore, the load on the server device for executing a re-encryption process can be reduced compared to the related technique.

In other words, the efficiency of re-encryption processing is improved; therefore, processing time can be reduced when downloading multiple messages upon a login of a user, and/or when multiple users log out at short intervals, and thereby, reduction in time as perceived by the user can be realized.

Also, a message key is not generated for each message, but used commonly for multiple messages; therefore, time taken for encryption processing when posting messages can also be reduced.

Therefore, time as perceived by a user in login/logout/message posting in a business chat service in which the present technique is implemented, can be made closer to the time as perceived in login/logout/message posting in a conventional business chat service in which end-to-end encryption is not implemented, and thus, an encrypted business chat service that is safe and efficient can be implemented.

(Summary)

The present specification discloses at least the following matters:

(Matter 1)

A server device used in a communication system that executes transmission and reception of messages via the server device among a plurality of communication terminals forming a group to which a group identifier is assigned, while concealing the messages to the server device, the server device comprising:

an encrypted message storage unit configured to save an encrypted text of a message generated by encrypting the message with a message key generated from a shared key shared among the plurality of communication terminals belonging to the group and the group identifier, by using a message key identifier as an identifier of the message key as a key;

an encrypted message key storage unit configured to save an encrypted text of the message key generated by encrypting the message key to be re-encryptable by using the shared key, by using the message key identifier as a key; and a re-encryption processing unit configured to receive, after the shared key has been updated, a re-encryption key from a communication terminal that has generated the re-encryption key by using the shared key and the updated shared key, use the re-encryption key to generate a re-encrypted encrypted text of the message key, and overwrite the encrypted text of the message key before re-encryption with the re-encrypted encrypted text of the message key to be saved, in the encrypted message key storage unit.

(Matter 2)

The server device as described in Matter 1, wherein the message key is a key generated by inputting the shared key and the group identifier into a twisted pseudorandom function or a pseudorandom function.

(Matter 3)

A communication terminal used in a communication system that executes transmission and reception of messages via a server device among a plurality of communication terminals forming a group to which a group identifier is assigned, while concealing the messages to the server device, the communication terminal comprising:

a message key generation unit configured to generate a message key from a shared key shared among the plurality of communication terminals belonging to the group, and the group identifier;

a message key encryption unit configured to generate an encrypted text of the message key by encrypting the message key to be re-encryptable, by using the shared key;

a message key identifier generation unit configured to generate a message key identifier as an identifier of the message key;

a message encryption unit configured to generate an encrypted text of a message by encrypting the message with the message key; and a transmitting unit configured to transmit the encrypted text of the message key, the message key identifier, and the encrypted text of the message to the server device.

(Matter 4)

The communication terminal as described in Matter 3, further comprising:

a re-encryption key generation unit configured to generate, after the shared key has been updated, a re-encryption key by using the shared key and the updated shared key, wherein the transmitting unit transmits the re-encryption key to the server device.

(Matter 5)

A communication system that executes transmission and reception of messages via a server device among a plurality of communication terminals forming a group to which a group identifier is assigned, while concealing the messages to the server device, wherein each of the plurality of communication terminals belonging to the group includes
a message key generation unit configured to generate a message key from a shared key shared among the plurality of communication terminals belonging to the group, and the group identifier,
a message key encryption unit configured to generate an encrypted text of the message key by encrypting the message key to be re-encryptable, by using the shared key,
a message key identifier generation unit configured to generate a message key identifier as an identifier of the message key,
a message encryption unit configured to generate an encrypted text of a message by encrypting the message with the message key, and
a transmitting unit configured to transmit the encrypted text of the message key, the message key identifier, and the encrypted text of the message to the server device, wherein the server device includes
an encrypted message storage unit configured to save the encrypted text of the message by using the message key identifier as a key,
an encrypted message key storage unit configured to save the encrypted text of the message key by using the message key identifier as a key,
a transmitting unit configured to transmit the encrypted text of the message key and the encrypted text of the message to a communication terminal belonging to the group, and
a re-encryption processing unit configured to receive, after the shared key has been updated, a re-encryption key from a communication terminal that has generated the re-encryption key by using the shared key and the updated shared key, use the re-encryption key to generate a re-encrypted encrypted text of the message key, and overwrite the encrypted text of the message key before re-encryption with the re-encrypted encrypted text of the message key to be saved, in the encrypted message key storage unit.

(Matter 6)

A program for causing a computer to function as respective units of the server device as described in Matter 1 or 2.

(Matter 7)

A program for causing a computer to function as respective units of the communication terminal as described in Matter 3 or 4.

As described above, the present embodiment has been described. Note that the present invention is not limited to such a specific embodiment, and various modifications and alterations can be made within the scope of the subject matters of the present invention described in the claims.

REFERENCES

Reference 1: D. Boneh, K. Lewi, H. Montgomery, and A. Raghunathan, "2015.Key Homomorphic PRFs and Their Applications", CryptologyePrint Archive, Report 2015/220, (2015), http://eprint.iacr.org/2015/220

References 2: Daisuke Moriyama, Ryo Nishimaki, Tatsuaki Okamoto, "Mathematics of public key cryptography", Kyoritsu Publishing, 2011

Reference 3: YONEYAMA, K., YOSHIDA, R., KAWAHARA, Y., KOBAYASHI, T., FUJI, H., and YAMAMOTO, T, (2018) "Exposure-Resilient Identity-Based Dynamic Multi-Cast Key Distribution", IEICE TRANSACTIONS on Fundamentals of Electronics, Communications and Computer Sciences, 101(6), 929-944

The present patent application claims priority based on Japanese Patent Application No. 2018-200333 filed on Oct. 24, 2018, and the entire contents of Japanese Patent Application No. 2018-200333 are incorporated herein by reference.

DESCRIPTION OF SYMBOLS

1 Network
11, 12, 13 communication terminal
100 server device
101 encrypted message storage unit
102 encrypted message key storage unit
103 group user storage unit
104 re-encryption processing unit
105 encrypted text receiving unit
106 encrypted text transmitting unit
111 shared key storage unit
112 message key storage unit
113 message key identifier storage unit
121 message key generation unit
122 message key identifier generation unit
123 message key management unit
124 re-encryption key generation unit
125 message encryption unit
126 message decryption unit
127 message key encryption unit
128 message key decryption unit
129 encrypted text transmitting unit
150 drive device
151 recording medium
152 auxiliary storage device
153 memory device
154 CPU
155 interface device
156 display device
157 input device

The invention claimed is:

1. A server device used in a communication system that executes transmission and reception of messages via the server device among a plurality of communication terminals forming a group to which a group identifier is assigned, while concealing the messages to the server device, the server device comprising:
a memory, and
a processor configured to execute operations comprising:
saving, in the memory, an encrypted text of a message generated by encrypting the message with a message key generated from a shared key shared among the plurality of communication terminals belonging to the group while excluding the server device and the group identifier, by using a message key identifier as an identifier of the message key as a key;
saving, in the memory, an encrypted text of the message key using the message key identifier as an index key, wherein the encrypted text of the message key is generated by a first communication terminal of the plurality of communication terminals, and the first communication terminal encrypting the message key to be re-encryptable by using the shared key; and receiving, after the shared key has been updated by a second communication terminal of the plurality of communication terminals, a re-encryption key from a third communication terminal of the plurality of communication terminals, wherein the second communication terminal has generated the re-encryption key by using the shared key and the updated shared key;

generating, by the processor, a re-encrypted encrypted text of the message key using the re-encryption key, to overwrite the encrypted text of the message key with the re-encrypted encrypted text of the message key to be saved, in the memory.

2. The server device as claimed in claim 1, wherein the message key is a key generated by inputting the shared key and the group identifier into a twisted pseudorandom function or a pseudorandom function.

3. The server device according to claim 1, wherein the server device includes a non-transitory computer-readable recording medium having computer-readable instructions stored thereon, which when executed, causes a computer to function as the server device as claimed in claim 1.

4. A communication terminal used in a communication system that executes transmission and reception of messages via a server device among a plurality of communication terminals forming a group to which a group identifier is assigned, while concealing the messages to the server device, the communication terminal comprising:

a memory, and a processor configured to execute operations comprising:

generating a message key from a shared key shared among the plurality of communication terminals belonging to the group while excluding the server device and the group identifier, and the message key is to be re-encryptable by using the shared key;

generating an encrypted text of the message key by encrypting the message key to be re-encryptable, by using the shared key;

generating a message key identifier as an identifier of the message key;

generating an encrypted text of a message by encrypting the message with the message key; and transmitting the encrypted text of the message key, the message key identifier, and the encrypted text of the message to the server device, wherein the encrypted text is to be re-encryptable by overwriting the encrypted text by the server device using a re-encryption key.

5. The communication terminal as claimed in claim 4, further comprising:

generating, after the shared key has been updated, the re-encryption key by using the shared key and the updated shared key, wherein the transmitting transmits the re-encryption key to the server device.

6. The communication terminal according to claim 4, wherein the communication terminal includes a non-transitory computer-readable recording medium having computer-readable instructions stored thereon, which when executed, causes a computer to function as the communication terminal as claimed in claim 4.

7. A communication system that executes transmission and reception of messages via a server device among a plurality of communication terminals forming a group to which a group identifier is assigned, while concealing the messages to the server device, wherein each of the plurality of communication terminals belonging to the group includes a memory, and a processor configured to execute generating a message key from a shared key shared among the plurality of communication terminals belonging to the group, and the group identifier, generating an encrypted text of the message key by encrypting the message key to be re-encryptable, by using the shared key, generating a message key identifier as an identifier of the message key, generating an encrypted text of a message by encrypting the message with the message key, and transmitting the encrypted text of the message key, the message key identifier, and the encrypted text of the message to the server device, wherein the server device includes a memory, and a processor configured to execute saving, in the memory, the encrypted text of the message by using the message key identifier as a key, saving, in the memory, the encrypted text of the message key by using the message key identifier as a key, wherein the encrypted text of the message key is generated by a first communication terminal of the plurality of communication terminals, and the first communication terminal encrypts the message kay to be re-encryptable by using the shared key, transmitting the encrypted text of the message key and the encrypted text of the message to a communication terminal belonging to the group, and receiving, after the shared key has been updated by a second communication terminal of the plurality of communication terminals, a re-encryption key from a third communication terminal of the plurality of communication terminals, wherein the second communication terminal has generated the re-encryption key by using the shared key and the updated shared key, generating a re-encrypted encrypted text of the message key using the re-encryption key to overwrite the encrypted text of the message key with the re-encrypted encrypted text of the message key and to store in the memory.

* * * * *